United States Patent [19]

Takahashi et al.

[11] Patent Number: 5,047,608
[45] Date of Patent: Sep. 10, 1991

[54] METHOD AND APPARATUS FOR RESISTANCE WELDING WHEREIN THE ELECTRODE AXIS IS INCLUDED WITH RESPECT TO THE ELECTRODE FORCING AXIS

[75] Inventors: Yasuo Takahashi; Tohru Saito; Masashi Ichikawa; Tadayuki Otani; Kunihiro Hayashida, all of Sagamihara, Japan

[73] Assignee: Nippon Steel Corporation, Tokyo, Japan

[21] Appl. No.: 482,796

[22] Filed: Feb. 21, 1990

[30] Foreign Application Priority Data

| Feb. 23, 1989 | [JP] | Japan | 1-41606 |
| Mar. 9, 1989 | [JP] | Japan | 1-54991 |
| Mar. 18, 1989 | [JP] | Japan | 1-64951 |
| Jul. 26, 1989 | [JP] | Japan | 1-192904 |
| Jan. 12, 1990 | [JP] | Japan | 2-3517 |

[51] Int. Cl.$^5$ ............................................ B23K 11/10
[52] U.S. Cl. ................................... 219/91.2; 219/119
[58] Field of Search ............... 219/86.25, 86.8, 91.2, 219/119

[56] References Cited

U.S. PATENT DOCUMENTS

| 1,196,852 | 9/1916 | Fulda . | |
| 2,432,750 | 12/1947 | Goldsworthy | 219/86.41 |
| 2,710,327 | 6/1955 | Powley . | |
| 3,109,087 | 10/1963 | Larkworthy . | |
| 3,115,570 | 12/1963 | Denzler et al. | 219/86.25 |

FOREIGN PATENT DOCUMENTS

| 2419271 | 11/1975 | Fed. Rep. of Germany | 219/119 |
| 1237786 | 1/1977 | German Democratic Rep. . | |
| 61-67978 | 5/1986 | Japan . | |
| 61-293679 | 12/1986 | Japan . | |
| 343798 | 7/1972 | U.S.S.R. | 219/86.25 |
| 1044448 | 9/1983 | U.S.S.R. | 219/86.25 |
| 563414 | 8/1944 | United Kingdom | 219/119 |
| 2130947 | 6/1984 | United Kingdom . | |

OTHER PUBLICATIONS

European Search Report, May 3, 1990 for European Application No. EP90103455.3.

Primary Examiner—Clifford C. Shaw
Attorney, Agent, or Firm—Kenyon & Kenyon

[57] ABSTRACT

A method and apparatus for resistance welding in which, while both or one of the electrode center axes of a pair of opposing electrodes is inclined with respect to the electrode forcing axis, the electrode tip of the electrode is intermittently pivoted about the electrode center axis for welding. The contact between the electrode tip and workpiece is moved at a preset number of welds to define a next contact surface on the face of the electrode tip, and thus the number of welds (electrode tip life) is considerably improved.

16 Claims, 16 Drawing Sheets

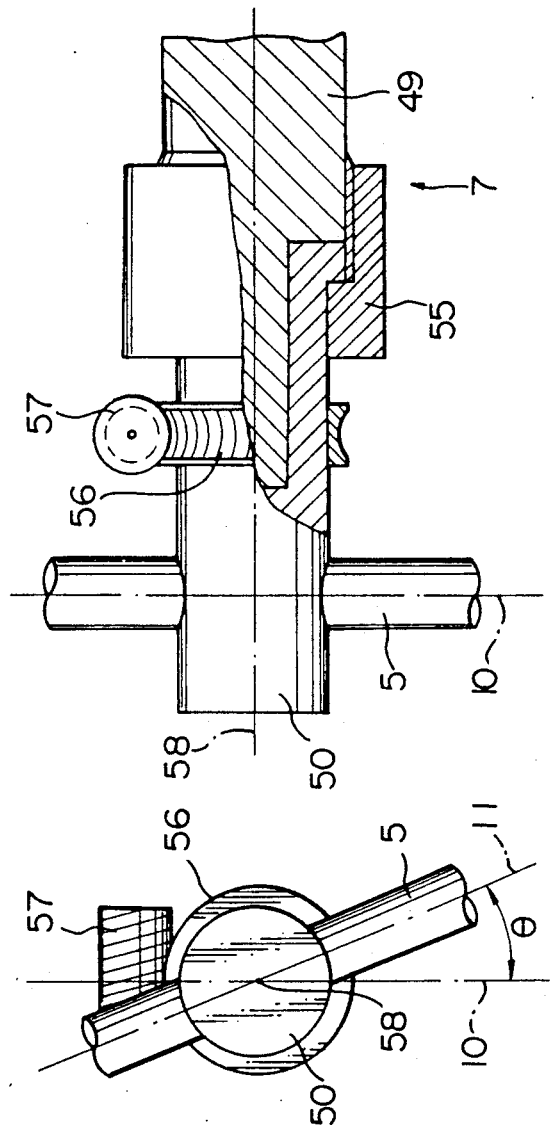

METHOD AND APPARATUS FOR RESISTANCE WELDING WHEREIN THE ELECTRODE AXIS IS INCLUDED WITH RESPECT TO THE ELECTRODE FORCING AXIS

BACKGROUND OF THE INVENTION

1. Field of the Invention

The present invention relates to an electric resistance welding, and more particularly, to a method and apparatus for resistance welding.

2. Description of the Related Art

In an electric resistance welding such as a spot welding, workpieces are forced together between a pair of upper and lower opposing electrodes and are welded to each other by applying a current therethrough for a predetermined time. In this widely used electric resistance welding method, electrode tips 1 and 2 are fixed directly to electrode holders 5 and 6, respectively, which are fixed to arms (also called horns) 7 and 8, respectively, or are fixed to the electrode holders by shanks (also called sleeves) 3 and 4, respectively, as shown in FIG. 2. The electrode assembly having such a construction has a sufficient electrode tip life if the workpieces are of a usual cold-rolled steel sheet, but where workpieces of a coated steel sheet such as a galvanized steel sheet are welded by electric resistance welding, as the number of welds increases, the electrode tips made of a material containing copper are alloyed by the coated metal on the steel sheets, resulting in wear and enlargement of the electrode tip face (contact with the steel sheet), whereby the current density is lowered and a specified nugget cannot be formed. Therefore, the productivity is unavoidably lowered because the time (number of welds) at which the electrode tip must be dressed or replaced is shortened.

Means for solving these problems are known as disclosed, for example, in Japanese Unexamined Patent Publication No. Sho 61-293679 and Japanese Unexamined Utility Model Publication No. Sho 61-67978. The welding machines disclosed in these Publications have an electrode forcing axis, electrode rotating axes disposed perpendicularly to the electrode forcing axis, and a plurality of electrode tips buried around the electrode rotating axis or an annular electrode disposed around the electrode rotating axis, which is intermittently rotated for welding. These machines are disadvantageous, however, in that they are large in scale and the workpieces that can be welded thereby are limited due to the structure thereof.

SUMMARY OF THE INVENTION

An object of the present invention is to overcome the above-mentioned drawbacks of the conventional welding methods and machines by providing a method and apparatus for resistance welding, by which the electrode tip life is prolonged even when welding coated steel sheets.

The above object is attained by providing a method of resistance welding with the electrode tips of a pair of opposing electrodes placed in contact with the surfaces of workpieces, in which a preset number of welds are made with the electrode tip faces placed in contact with the workpiece surfaces, the electrode tips are then relocated, and next contact surfaces are formed on the electrode tip faces; these steps being sequentially repeated.

To implement this method, the present invention provides a resistance welding machine in which both or one of the center axes of a pair of opposing electrodes are or is inclined with respect to an electrode forcing axis, having a mechanism by which an intermittent change of the inclination is made or a mechanism by which the electrode tip is pivoted about the electrode center axis inclined with respect to the electrode forcing axis.

BRIEF DESCRIPTION OF THE DRAWINGS

FIG. 7(a) and 7(b) show an embodiment of the guide recess and guide pin in FIG. 6, of which FIG. 7(a) is a side elevation and FIG. 7(b) is a sectional view taken along the line A—A in FIG. 7(a);

FIG. 8 is a sectional view showing another embodiment of the guide recess and guide pin;

FIGS. 11(a), 11(b) and 11(c) show yet another embodiment of the electrode in the resistance welding machine according to the present invention, of which FIG. 11(a) is a partially sectional view, FIG. 11(b) is a perspective view of the pivot mechanism and FIG. 11(c) is a sectional view taken along the line A—A in FIG. 11(a);

FIG. 21(a) is a front view of another embodiment of the upper-arn tilting mechanism in the resistance welding apparatus according to the present invention;

FIG. 21(b) is a similar side elevation to FIG. 21(a);

DESCRIPTION OF THE PREFERRED EMBODIMENTS

The present invention will be described below with reference to the drawings.

First, for an easy understanding of the present invention, the conventional electrode assembly will be described with reference to FIG. 2.

In Figure, the electrode consists of upper and lower electrode tips 1 and 2, and shanks (or sleeves) 3 and 4 fixed to electrode holders 5 and 6, respectively, which are secured to upper and lower fixed arms 7 and 8, respectively. Generally, the electrode forcing axis 9 coincides with the electrode center axes, and the faces of the electrode tips 1 and 2 are kept in contact with workpieces, respectively, for welding.

Figure 1:
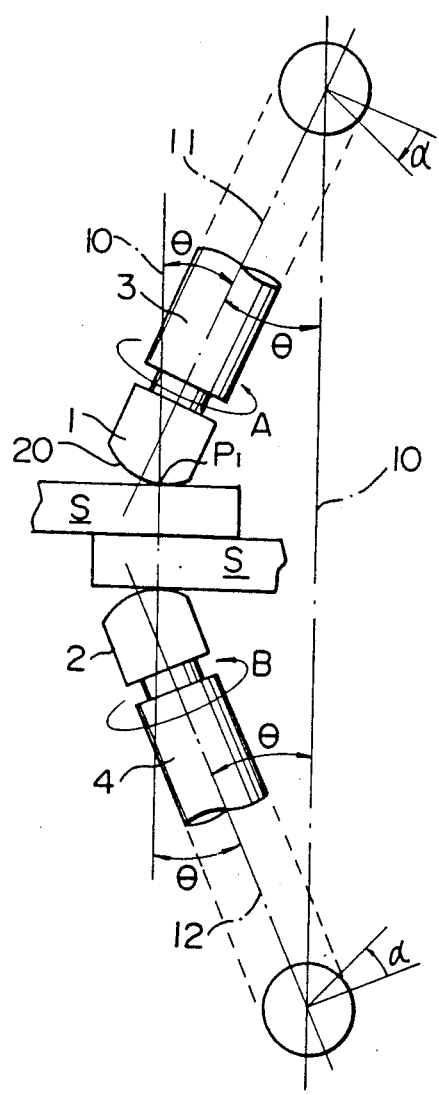
FIG. 1 is a side elevation of the electrode assembly, showing an embodiment of the method of resistance welding according to the present invention.
Figure 3:
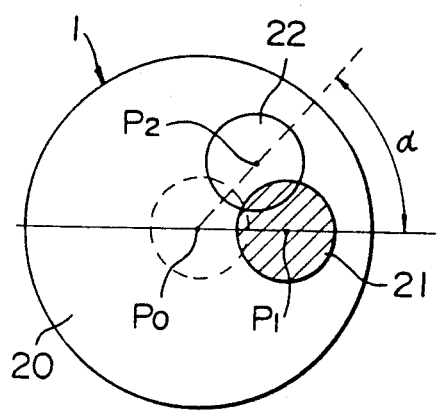
FIG. 3 is a plan view of an embodiment of the electrode tip face of the resistance welding apparatus according to the present invention.

The principle of the present invention is as shown in FIG. 1. Namely, the pair of opposing upper and lower electrodes are disposed in such a manner that the center axes 11 and 12 of the electrodes are inclined at a predetermined angle θ with respect to the electrode forcing axis 10 through workpieces S. The upper and lower electrodes are intermittently rotated about the electrode center axes 11 and 12 respectively, by a predetermined angle α, in the directions of arrows A and B. When welding is carried out in this condition, the electrode tips 1 and 2 are kept in contact with the workpieces S as shown in FIG. 3, which is a plan view of the electrode tip. The center $P_1$ of the contact with the workpiece is the angle θ offset from the central point $P_0$ of the face of the electrode tip 1, and thus the surface of contact (current path surface) 21 with the workpiece is offset from the center axis of the electrode. If the electrode is rotated through the predetermined angle α at welding intervals of one to several hundreds spots, in this condition, the center of contact moves to $P_2$ and a new contact surface 22 is defined thereat. This movement is sequentially repeated, and thus the contact surface correspondingly moved and renewed.

Figure 2:
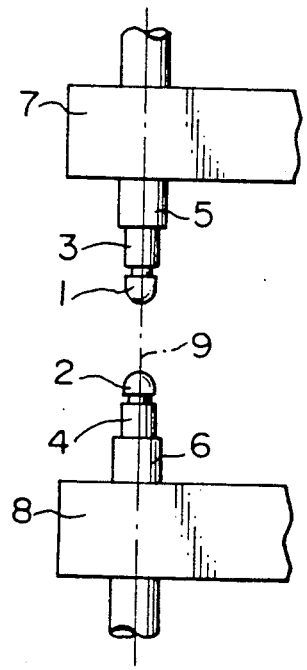
FIG. 2 is a side elevation of an embodiment of the conventional electrode assembly.

In the conventional resistance welding, welding is carried out only at the face of the electrode tip as the current path surface, as shown in FIG. 2. According to the present invention, however, the whole surface of an electrode tip can be defined as the current path surface.

The welding described above can be implemented by inclining the electrodes in all directions, as described later, as well as by a combination of the inclination and pivoting of the electrodes as shown in FIG. 1.

The present invention will be described in more detail below.

Figure 4:
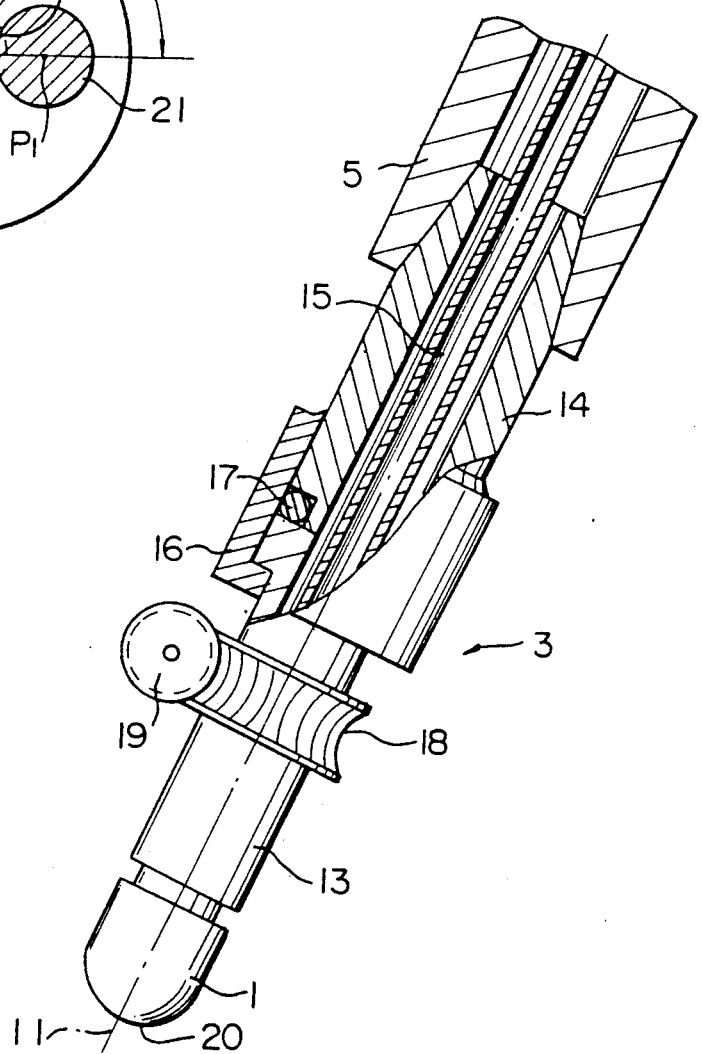
FIG. 4 is a partially sectional, side elevation of an embodiment of the electrode in the resistance welding apparatus according to the present invention.

First the means for pivoting the electrode will be discussed. FIG. 4 shows an embodiment in which the shank 3 is pivoted, and as seen from the figure, the electrode tip 1 is fixed to an A-shank 13. To enable the pivoting about the center axis 11 of the electrode, the A-shank 13 is coupled with a stationary B-shank 14 by a coupling sleeve 16, and the B-shank is fixed to the electrode holder 5. Disposed at the center of the electrode 15 is a coolant pipe 15 opened at the end thereof inside the electrode tip 1. The connection between the A-shank 13 and B-shank 14 is sealed with an O-ring 17, to prevent a leakage of the water supplied through the coolant pipe 15 for cooling the electrode tip 1. The A-shank 13 is coupled with the coupling sleeve 16 such that a sufficient electric contact is assured even while the electrode tip is rotating and sliding. The electrode tip 1 is rotated by a worm wheel 18 installed on the A-shank 13 and rotated by a worm gear 19.

The drive used to pivot the electrode may be a well-known one (not shown) such as a motor, air cylinder or one which utilizes the up and down motion of the electrode, and the means for transmitting the drive force may be any one selected from among a worm gear described as one example in the above, a gear such as rack pinion, bevel gear or the like, or a chain, belt, linkage, cam mechanism or the like, which are well known (not shown). The electrodes are not pivoted when workpieces are held therebetween, but when the electrodes are offset from each other. Although FIG. 4 shows an embodiment in which the shank is pivotable, the electrode holder may be arranged to be pivotable instead.

Figure 5A:
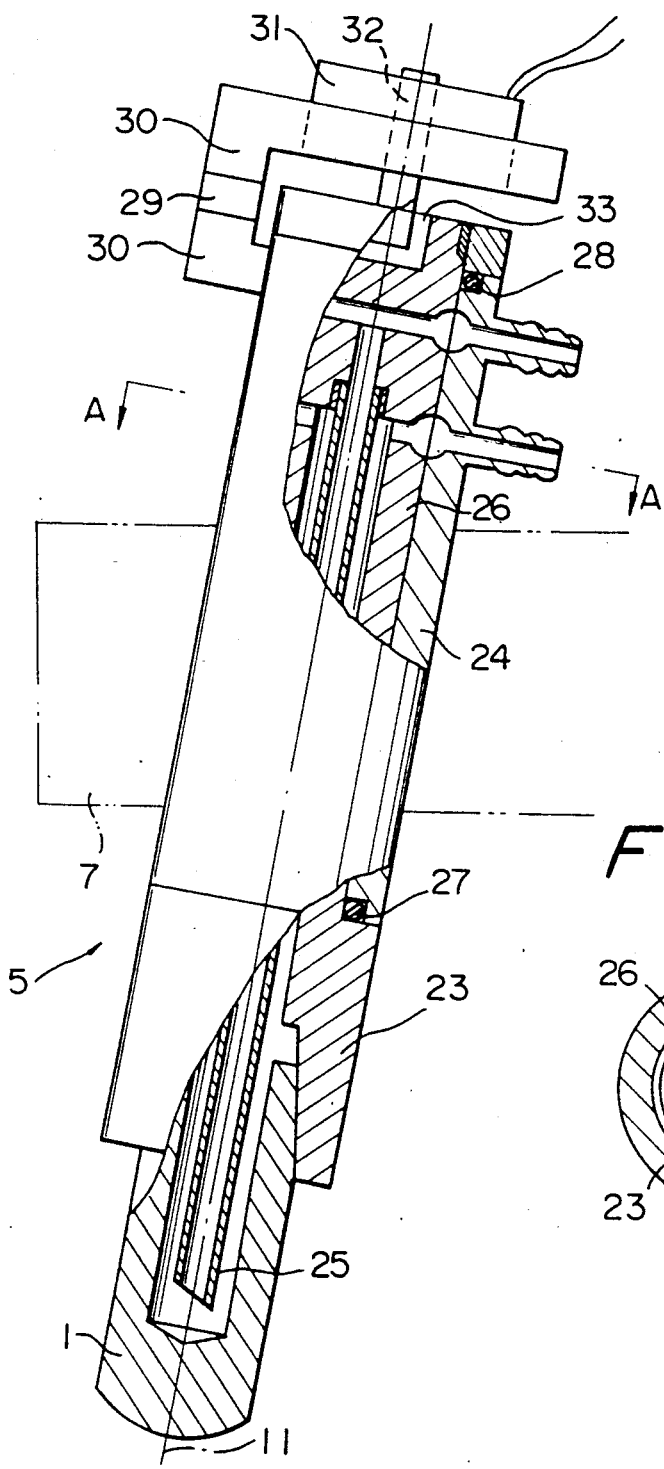
FIG. 5(a) is a partially sectional, side elevation of another embodiment of the electrode in the resistance welding apparatus according to the present invention.
Figure 5B:
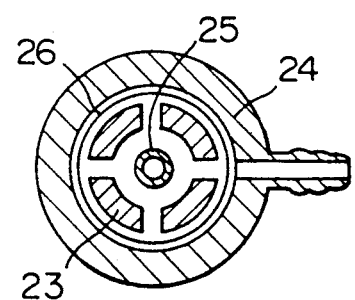
FIG. 5(b) is a sectional view taken along the line A—A of FIG. 5(a)

Next, an embodiment is explained in which the electrode holder 5 is pivotable. FIGS. 5(a) and 5(b) show the electrode tip 1 fixed to a pivotable electrode holder 23. To enable the pivoting about the electrode center axis 11, the pivotable electrode holder 23 is fitted in a stationary electrode holder 24 with a rotating/sliding surface 26 therebetween, and the stationary electrode holder 24 is fixed to the arm 7. Disposed in the middle of the electrode holder 23 is a coolant pipe 25 secured to the pivotable electrode holder 23. The connections between the pivotable electrode holder 23 and stationary electrode holder 24 are sealed with O-rings 27 and 28, respectively, to prevent a leakage of the water cooling the electrode tip 1. It should be noted that a water supply route is always ensured even while the pivotable electrode holder 23 is rotating, as shown in FIG. 5(b). Also, the pivotable electrode holder 23 and stationary electrode holder 24 are placed in contact with each other such that a sufficient electric contact is maintained therebetween that the welding current is passed through the rotating/sliding surfaces 26.

To pivot the electrode tip 1 and pivotable electrode holder 23, the stationary electrode holder 24 is provided with a motor 31 such as a stepping (pulse) motor, servo motor or the like supported by a motor support 30. To prevent a flow of the welding current to the motor, the stationary electrode holder 24 and the motor 31 are electrically insulated from each other by an insulator 29. A drive coupling shaft, or a motor shaft (spindle) 23 in this case, is fixed to the pivotable electrode holder 23 by an insulator 33 and rotates the pivotable electrode holder 23 when rotated by the motor shaft 32.

The timing or amount (angle) of the rotation of the motor 31 is controlled by a well-known controller (not shown). For this control, the rotation timing (frequency of rotation in number of times/weld), rotation angle, and rotation direction, etc. are preset in this embodiment, but may be controlled by a signal indicative of the up and down motion of the electrode, a weld signal from the welding machine, or a signal output from a counter which counts number of welds made by the welding machine. Note that the electrodes is not pivoted while holding workpieces therebetween, but only when the electrodes are offset from each other.

FIG. 5(a) shows, as an example, the motor shaft 32 disposed on the electrode center axis, but the present invention is not limited to this embodiment and the motor shaft 32 may be offset from the electrode center axis or inclined with respect to the electrode center axis, and not perpendicular thereto. In this case, a well-known drive force transmission may be used in addition to the gears such as the worm gear, bevel gear or the like, and a reduction gear may be used for the mechanical coupling of the motor shaft 32 and the pivotable electrode holder 23.

Figure 6:
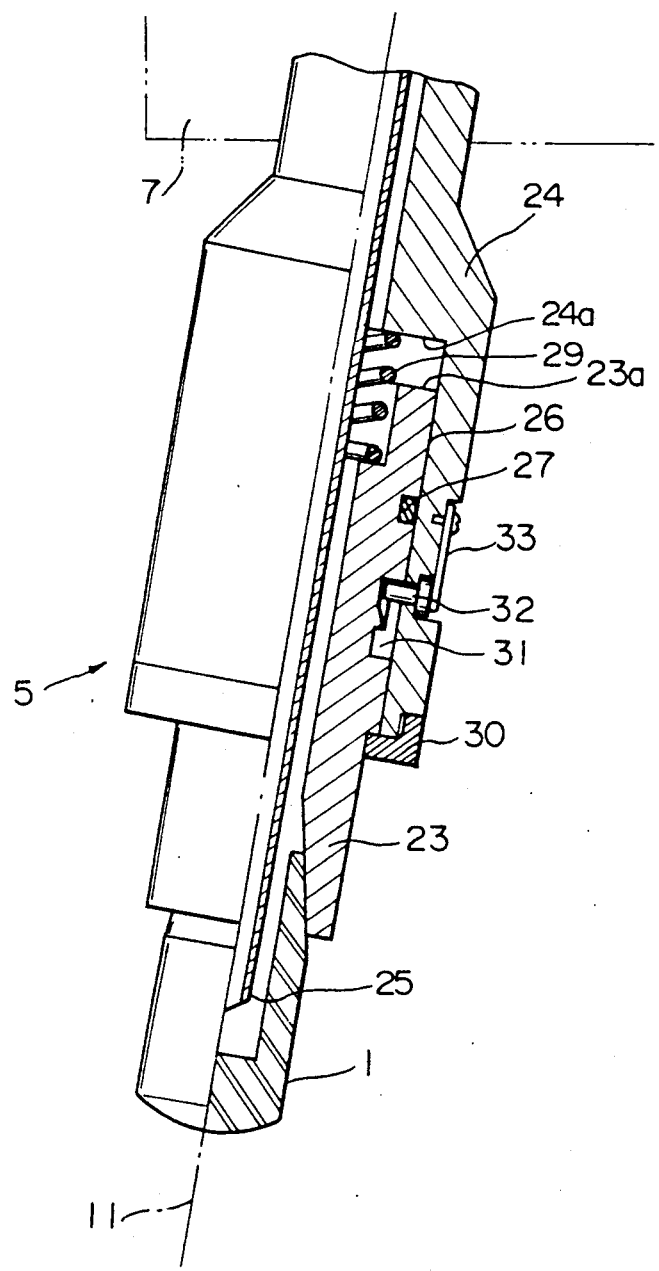
FIG. 6 is a partially sectional, side elevation of yet another embodiment of the electrode in the resistance welding apparatus according to the present invention.

FIG. 6 and 7 show another embodiment of the present invention.

As seen from the Figures, the electrode tip 1 is fixed to the pivotable electrode holder 23. To enable a pivoting about the electrode center axis 11, the pivotable electrode holder 23 is fitted in the stationary electrode holder 24 with a rotating/sliding surface 26 therebetween, and the stationary electrode holder 24 is fixed to the arm 7. Disposed in the middle of the electrode holder 23 is a coolant pipe 25 secured to the pivotable electrode holder 23. The pivoting/sliding surface 26 between the pivotable electrode holder 23 and stationary electrode holder 24 is sealed with the O-ring 27 to prevent a leakage of the water cooling the electrode tip 1. Also, the pivotable electrode holder 23 and stationary electrode holder 24 are placed in contact with each other so that a sufficient electric contact exists therebetween for passing a welding current through the rotating/sliding surface 26.

To enable a pivoting of the electrode tip 1 and pivotable electrode holder 23, the pivotable electrode holder 23 has a pin guide recess 31 formed therein. The stationary electrode holder 24 has a pivot guide pin 32 pivotably disposed therein and retained with a leaf spring 33. Also, a coil spring 29 is inserted between the pivotable electrode holder 23 and stationary electrode holder 24, to provide a constant separating force between the holders. Furthermore, the stationary electrode holder 24 is provided with a stopper ring 30, to prevent a detaching of the pivotable electrode holder 23 from the stationary electrode holder 24.

Figure 7A:
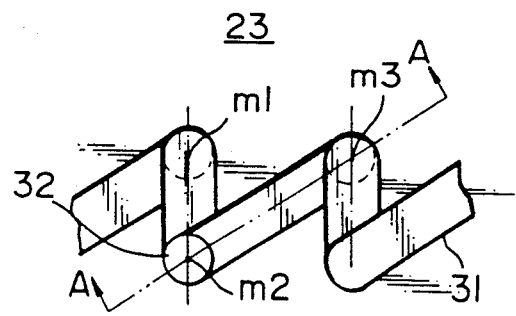
Figures 7B, 8:
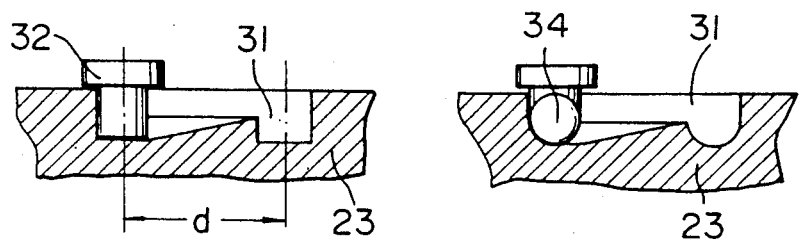
Figure 9:
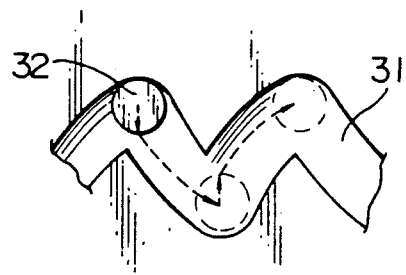
FIG. 9 is a side elevation showing yet another embodiment of the guide recess in FIG. 6.

The pivotable electrode holder 23 is rotated by utilizing the electrode force as well as the electrode up and down motion. The rotation of the pivotable electrode holder 23 will be described in detail with reference to FIGS. 6 and 7(a) and 7(b). FIG. 7(a) is a side elevation of the pin guide recess, and FIG. 7(b) is a sectional view taken along the line A—A in FIG. 7(a).

As seen from these Figures, the pivot guide pin 32 disposed in the stationary electrode holder 24 is slidably engaged in the pin guide recess 31 formed in the pivotable electrode holder 23. Before the electrodes are moved to the welding position, the pin 32 is at a position m1, and after a force for welding is applied, the pin 32 is moved to a position m2. In this condition, a predetermined welding is carried out and the electrodes are then no longer subjected to the force for welding. Subsequently, the electrode rises, and at this time, the pin 32 is forced under the action (repulsion) of the spring 29 to return to its initial state, but cannot return to the position m1 whereat it is restrained by the step of the guide recess 31, and accordingly, the pin 32 moves to a position m3 along the guide recess 31. As a result, the pin 32 is moved over a distance d from m1 to m3 by one welding action (up-down motion of the electrode).

FIG. 7 shows the motion of the guide pin 32, for an easy understanding of this mechanism. Since, however, the guide pin 32 is disposed on the stationary electrode holder 24, in practice the guide recess 31 moves over the distance d, and because the guide recess 31 is formed in the pivotable electrode holder 23, the latter will be rotated for an angle corresponding to the distance d. Where the moving distance d is, for example, 1/6 of the whole circumferential length of the pivotable electrode holder 23 (number of bends of the guide recess:6), the electrode tip 1 will be rotated by 60 degrees per weld. Therefore, the angle of rotation of the electrode tip 1 depends upon the number of bends of the guide recess 31 formed on the pivotable electrode holder 23.

Note that the repulsion of the spring 29 is less than the ordinary electrode force but more than the sliding resistance of the rotating/sliding surface 26. Therefore, the sliding resistance of the rotating/sliding surface 26 must be as low as possible, while ensuring an electric contact. When the electrodes are forced onto the work pieces, however, the end 23a of the pivotable electrode holder 23 is forced onto the wall 24a of the stationary electrode holder 24 against the repulsion of the spring, and a sufficient electric contact is provided by the contact between the pivotable and stationary electrode holders 23 and 24 when forced together.

The motion of the pivotable electrode (generally, upper electrode) illustrated and described above also holds true for the lower electrode. Both the upper and lower electrodes may be rotated in a same direction or in opposite directions. Further, the guide pin may be disposed on the pivotable electrode holder 23 and the guide recess may be formed in the stationary electrode holder 24, converse to the arrangement shown in FIG. 6.

FIG. 7 shows an example of a combination of a square recess and pin, but the present invention is not limited to this embodiment, and the combination of recess and pin may be a well-known one such as a combination of a round recess and guide ball 34 shown as an example in FIG. 8. Also, FIG. 7 shows, as an example, a stepped guide recess for a positive movement of the guide pin, but the present invention is not limited to this embodiment and any other shape of recess may be adopted if the guide pin 32 can be securely moved along the guide recess 31 under the electrode force and spring repulsion.

Figure 10A:
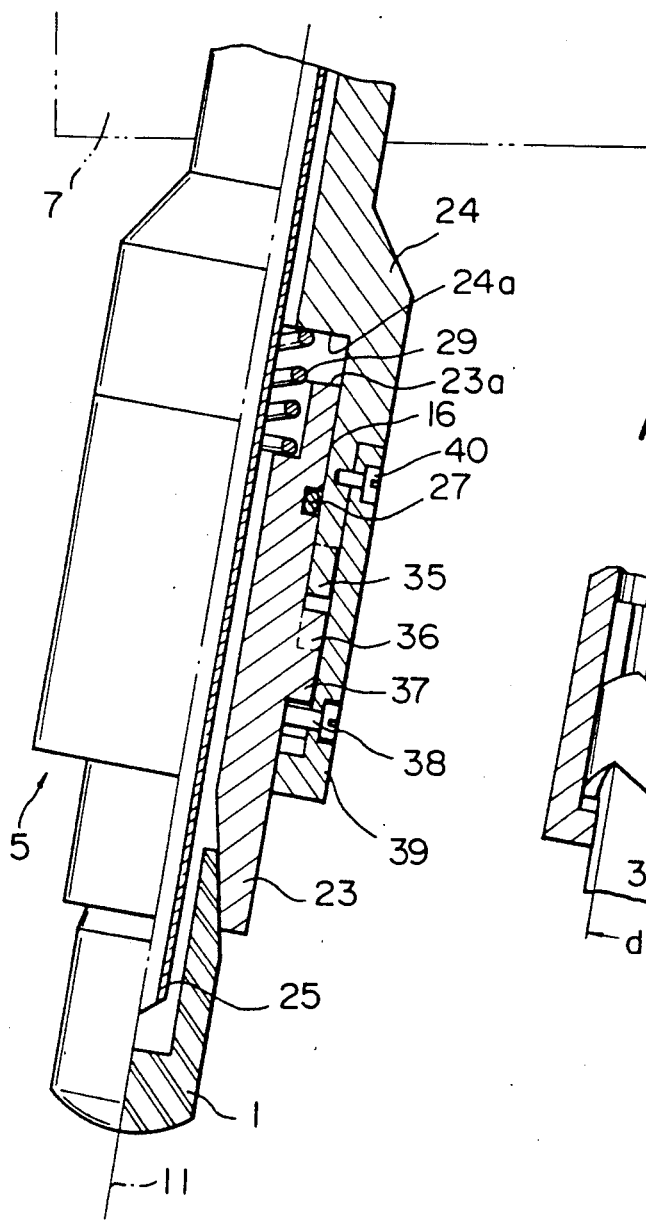
FIG. 10(a) is a partially sectional, side elevation of still another embodiment of the electrode in the resistance welding apparatus according to the present invention.

Next, an embodiment in which the electrode is rotated by a cam mechanism will be described with reference to FIGS. 10(a) and 10(b). Cams 36 and 37 are disposed on the pivotable electrode holder 23 and a cam 35 is disposed on the stationary electrode holder 24. Further, a pin 38 is provided on a sleeve 39 fixed with a binding screw 40 to the stationary electrode holder 24. The sleeve 39 serves as a stopper to prevent a detaching of the pivotable electrode holder 23 from the stationary electrode holder 24, and serves to retain the pin 38 in the predetermined position. The cam 35 acts on the cam 36 and the pin 38 acts on the cam 37.

Figure 10B:
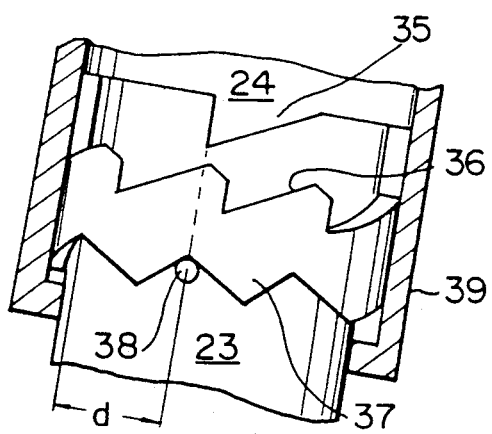
FIG. 10(b) is a partially sectional, side elevation of an embodiment of the cam-pin mechanism in FIG. 10(a)

Owing to the repulsion of the coil spring 29, the cams 35, 36, 37 and pin 38 are normally positioned as shown in FIG. 10(b). As the pivotable electrode holder 23 is moved under the electrode force, the cam 36 touches the cam 35 on the stationary electrode holder 24, and as it is rotated and moves along its counterpart surface, the cams 35 and 36 are forced against each other. At this time, the cam 37 and pin 38 are separated, and in this condition a predetermined welding is made. When the electrode is lifted after the welding, the repulsion causes the separation of the cams 35 and 36 engaged with each other, and the cam 37 separated from the pin 38 touches the latter so that the pivotable electrode holder 23 is moved and rotated along the slope of the cam 37. With this series of motions (per weld), the pivotable electrode holder 23 is moved and rotated over the distance d.

Where the moving distance d is, for example, 1/6 of the whole circumferential length of the pivotable electrode holder 23 (number of cam teeth:6), the electrode tip 1 will rotate by 60 degrees per weld. Therefore, the angle of rotation of the electrode tip 1 depends upon the number of teeth of the cam 36 disposed on the pivotable electrode holder 23. Also, the number of teeth of the cam 35 provided on the stationary electrode holder 24 and the number of pins 38 can be freely selected within a range of from one to the number of teeth of the cams 36 and 37. The rotation due to the combination of the cams 35, 36, 37 and pin 38 has been described as an example above, but the present invention is not limited to this embodiment. The pivotable electrode holder 23 may be driven by a means for converting a linear movement into a rotation in one direction, such as any well-known cam mechanism, ratchet, etc.

Note that the repulsion of the coil spring 29 is less than the usual electrode force but is more than the sliding resistance of the rotating/sliding surface 26. Therefore, the sliding resistance of the rotating/sliding surface 26 must be as low as possible while ensuring the electric contact.

In the embodiment of the present invention illustrated and described with reference to FIGS. 6 to 10, the electrode pivoting mechanism is disposed on the electrode holders, but the pivoting mechanism may be disposed in any position other than described; for example, it may be provided on the shank or arm.

Next, another embodiment in which the electrode is rotated under the action of a fluid pressure will be described with reference to FIG. 11.

Figure 11A:
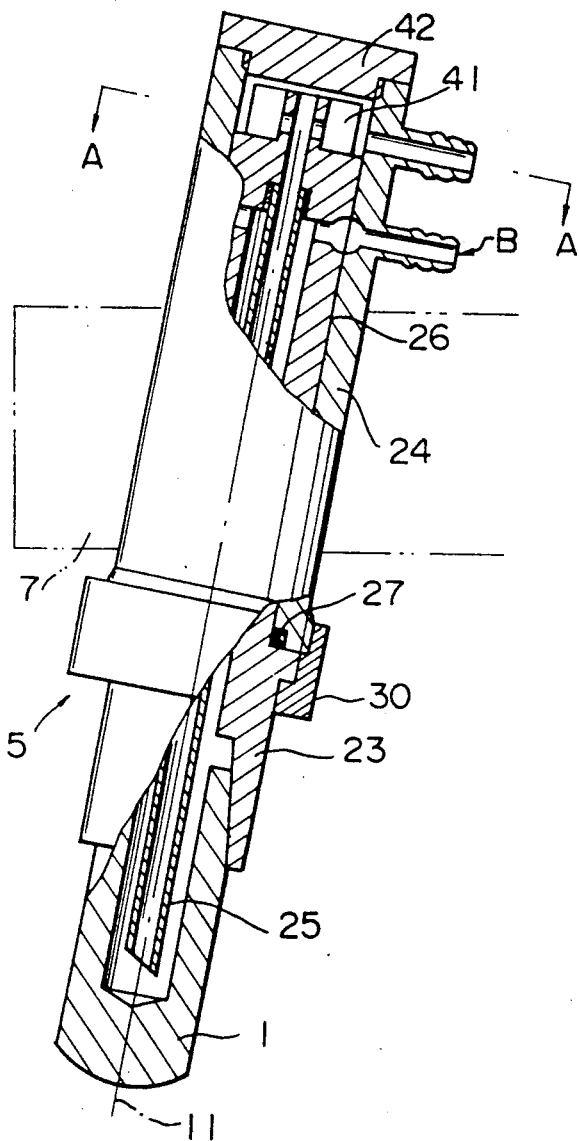

As shown in FIG. 11(a), the electrode tip 1 is fixed to the pivotable electrode holder 23, which is fitted in the stationary electrode holder 24 with the rotating/sliding surface 26 therebetween for pivoting about the electrode center axis 11, and the stationary electrode holder 24 is fixed to the arm 7. Disposed in the middle of the electrode is the coolant pipe 25 secured to the pivotable electrode holder 23. To prevent a leakage of the water cooling the electrode tip 1, the connection between the pivotable electrode holder 23 and stationary electrode holder 24 is sealed with the O-ring 27. The coolant supply B has a structure such as shown in FIG. 5(b), whereby a flow of water can be ensured even when the pivotable electrode holder 23 is rotated. Also the contact of the pivotable electrode holder 23 in the stationary electrode holder 24 is such that a sufficient electric contact through the rotating/sliding surface 26 can be assured, for passing a welding current. The stationary electrode holder 24 is provided with a stopper ring 30, to prevent a detaching of the pivotable electrode holder 23 from the stationary electrode holder 24.

Figure 11B:
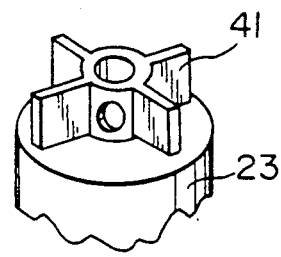
Figure 11C:
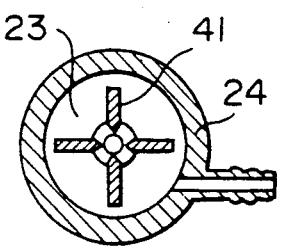

To enable a pivoting of the electrode tip 1 and pivotable electrode holder 23, a water wheel (vanes) 41 is provided in the coolant supply to the pivotable electrode holder 23. The appearance of the water wheel 41 is shown in FIG. 11(b), and the sectional view taken along the line A—A of FIG. 11(a) is shown in FIG. 11(c). As the water wheel 41 receives the energy of the water, which flows into the electrode and cools the electrode tip 1, the water wheel 41 rotates in a fixed direction. The water wheel 41 is fixed to the pivotable electrode holder 23 and the electrode tip 1 is secured to the pivotable electrode holder 23 so that, as the water wheel 41 rotates, the electrode tip 1 is directly rotated. The coolant acting on the water wheel 41 flows into the water hole formed through the center shaft of the water wheel 41 and is discharged after cooling the electrode tip 1.

Generally, the coolant for the electrode tip 1 is always supplied during the operation of the welding machine, so that the upper and lower electrode tips are always rotating. Nevertheless, due to the electrode force acting on the electrode tip 1 during welding, a larger force than the force of the flowing water rotating the water wheel 41 is applied to the electrode tip, which in turn is not rotated but is motionless during welding. In this condition, a predetermined welding current is supplied. Next, after a predetermined holding time has elapsed, the upper electrode rises and welding (one weld) is completed. Then the electrode tip is free from the electrode force applied, and at a same time the electrode tip 1 resumes rotation under the action of the coolant.

In this mechanism, the electrode rotates when welding is not conducted, and is motionless when welding is performed, but the angle and speed of the rotation are random. The speed of rotation depends upon the sliding resistance of the rotating/sliding surface 26 as well as the coolant flow rate and shape of the water wheel 41, etc.

Figure 12:
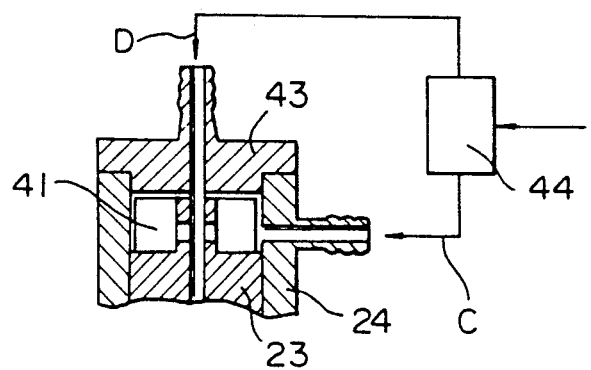
FIG. 12 is a sectional view of another embodiment of the pivot mechanism of the resistance welding machine shown in FIG. 11.

The means for intermittently rotating the electrode tip 1 will be described with regard to the construction of the water wheel 41 and associated parts, with reference to FIGS. 12 and 13. As shown in FIG. 12, an electromagnetic valve 44 is disposed in the coolant supply line and the line has a structure such that a coolant route is selected as indicated by the arrow C or D. When the coolant flows via the route indicated by the arrow C, it will act on the water wheel 41 and the electrode is rotated. On the contrary, when the coolant is supplied via a route indicated by the arrow D, selected by the electromagnetic valve 44, it flows directly into the center shaft of the water wheel 41, does not impart a rotation to the water wheel 41, and the coolant is discharged after cooling the electrode. Namely, the frequency of rotation of the electrode can be controlled by the electromagnetic valve known per se, without influence on the cooling of the electrode.

Figure 13:
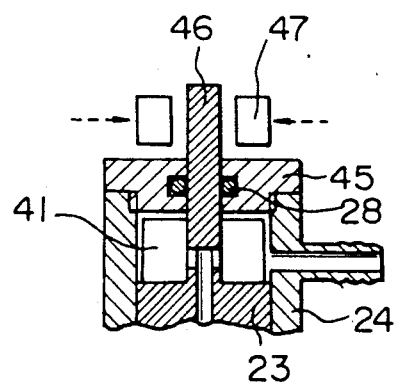
FIG. 13 is a sectional view of yet another embodiment of the pivot mechanism of the resistance welding apparatus shown in FIG. 11.

As shown in FIG. 13, the center shaft of the water wheel 41 is extended by a spindle 46 and projected outwardly through an end plate with an O-ring. The spindle 46 is provided with a brake 47 of a well-known construction. By turning the brake 47 on and off as required, the electrode rotation can be controlled.

In the aforementioned embodiment, the fluid for rotating the water wheel 41 is a coolant as an example, but this is not limited to water and can be a gas such as air, nitrogen gas or the like, an alcohol such as ethylene glycol or the like, an oil such as cutting fluid, or a fluid such as mixture of any of the above with water, which has a cooling effect.

In the foregoing, the mechanism for rotating the electrode tip 1 has been concretely described, and now the means for inclining the electrode center axis with respect to the electrode forcing axis will be described.

First, the stationary means for inclination will be described.

Figure 14:
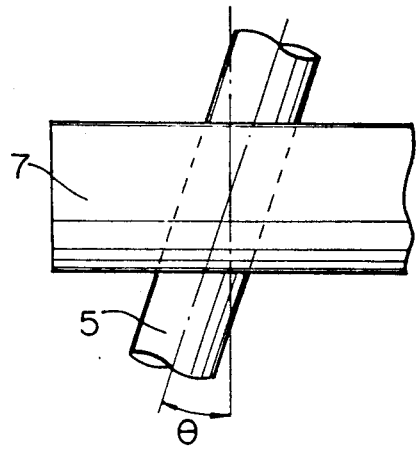
FIG. 14 is a side elevation of an embodiment of the electrode holder installation.
Figure 15:
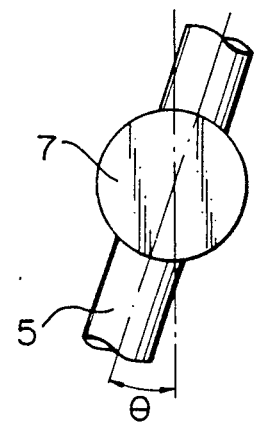
FIG. 15 is a front view of the installed electrode holder.
Figure 16:
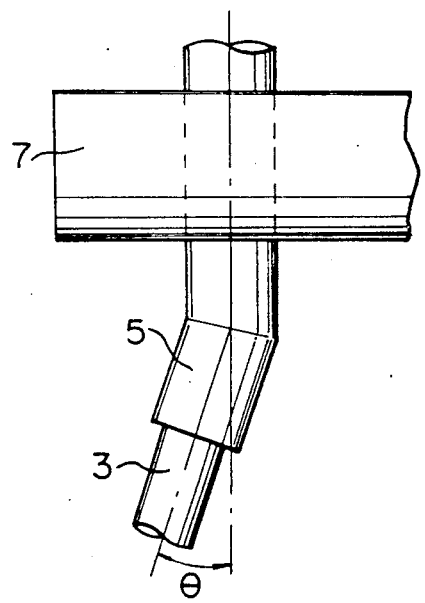
FIG. 16 is a side elevation of an embodiment of the electrode holder.
Figure 17:
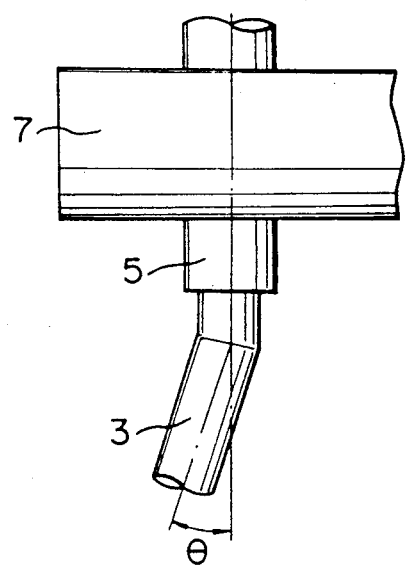
FIG. 17 is a side elevation of the shank.
Figure 18:
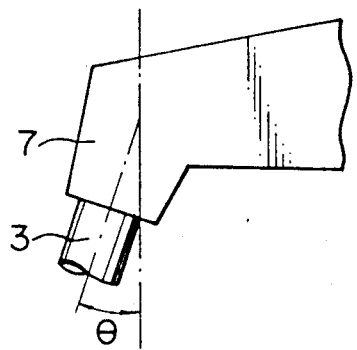
FIG. 18 is a side elevation of an embodiment of the arm in the portable spot welding machine.

To incline the electrode center axis with respect to the forcing axis, the electrode holder 5 is installed as inclined with respect to the arm 7 as shown in FIGS. 14 and 15, the electrode holder 5 is bent at an angle $\theta$ of inclination as shown in FIG. 16, the shank 3 is bent at an angle $\theta$ of inclination as shown in FIG. 17, or an additional pivoting device is provided if the arm itself is bent like the arm 7 of the portable spot welder shown in FIG. 18.

Next, the means for inclination having a tilting function will be described below.

Figure 20A:
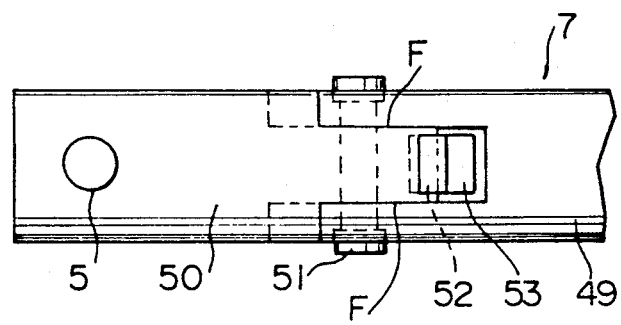
FIG. 20(a) is a plan view of the upper-arm tilting mechanism in the resistance welding apparatus according to the present invention.
Figure 20B:
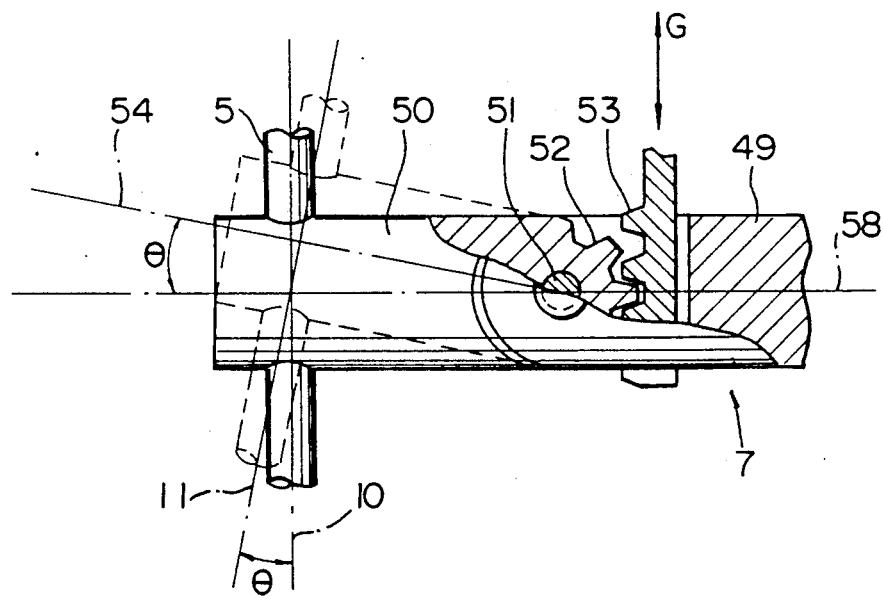
FIG. 20(b) is a similar side elevation to FIG. 20(a)

FIG. 20(a) and 20(b) shows an embodiment in which the electrode assembly has a tilting function according to the present invention, for the upper arm.

FIG. 20(a) is a plan view of the mechanism for tilting the upper arm 7, and FIG. 20(b) is a side elevation of the tilting mechanism. As seen from these Figures, a tilting arm 50 is coupled to the sliding surface of a stationary arm 49 by an axis of tilt (pin 51) in such a manner that an electric contact is maintained and the tilting arm 50 is slidable. Since the center axis 11 of the electrode holder is intermittently tilted at an angle $\theta$ with respect to the forcing axis 10 of the electrode holder 5 fixed to the tilting arm 50, a rack 53 rotating a pinion 52 provided on the tilting arm 50 is intermittently moved up and down in the direction of the arrow G, thereby tilting the center Axis 54 of the tilting arm to an angle $\theta$ to tilt the center axis 11 of the electrode holder. In this embodiment, the motion of the lower arm is not described, but the upper and lower electrode tips are tilted while being always opposed to each other, and the tilting mechanism for the lower arm is similar to that for the upper arm. The mechanism for tilting the electrode center axis may be any structure by which the electrode can be tilted vertically with respect to the arm center axis 58 as shown in FIG. 20. For example, the tilting mechanism may be one by which the electrode is pivoted horizontally about the arm center axis 58 as shown in FIGS. 21(a) and 21(b). FIG. 21(a) is a front view of the upper-arm tilting mechanism and FIG. 21(b) is a side elevation of the mechanism. As shown in these Figures, the electrode holder 5 is fixed to the tilting arm 50, which is coupled with the stationary arm 49 by a coupling sleeve 55 in such a manner that the arm 50 is slidable (tiltable) and a sufficient electric contact can be ensured. To intermittently tilt the electrode holder 5 about the center axis 58 of the arm at an angle $\theta$, a worm 57 paired with a worm wheel 56 provided on the tilting arm 50 is rotated to tilt the electrode holder 5.

The drives for tilting the electrode and for pivoting the electrode may be well-known drives utilizing the up-down motion of the electrode, such as a motor, air cylinder or the like, and the means for transmitting the drive force may be a well-known one selected from among gears such as the rack pinion shown as an example in FIG. 20, the worm gear shown as an example in FIG. 21 and a bevel gear, chain, belt, linkage, cam mechanism or the like. Note that the electrodes are not tilted and pivoted when workpieces are held therebetween, but only when the electrodes are separated. Also, the rotating/sliding surface should provide a sufficient electric contact.

FIG. 20 and 21 show an embodiment in which the tilting mechanism is disposed on the arm center axis. The present invention is not limited to this embodiment, and the tilting mechanism may be provided on the center axis of the electrode holder, at the intersection between the arm and electrode center axes, or at any other location.

According to the present invention, workpieces are welded while held and forced together between the upper and lower electrode tips under the action of the pivoting mechanism and tilting mechanism (or inclining mechanism) described above, while supplied with a welding current for a predetermined time.

Figure 22B:
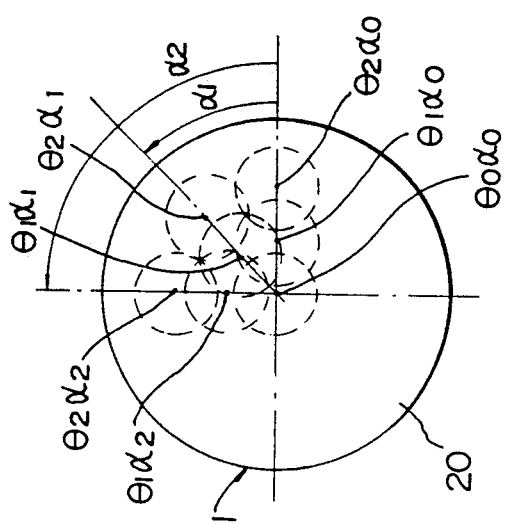
FIG. 22(a) and 22(b) are plan views of the electrode tip face, showing the embodiment of the resistance welding apparatus shown in FIGS. 20 and 21.
Figure 22A:
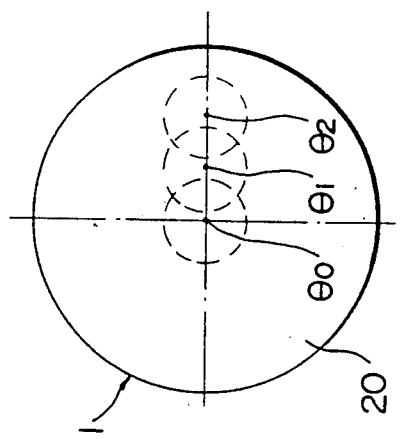

The current passed on the electrode tip face when a weld is made under the action of the aforementioned electrode holder pivoting and tilting mechanisms will be described with reference to FIG. 22. FIG. 22(a) shows the contacts of the electrode tip face 20 with the workpiece when the electrode holder is intermittently tilted (inclined). When the electrode is moved by a predetermined angle with respect to the point $\theta_0$ at the center of the contact surface during a coincidence of the electrode center axis with the forcing axis, the center of the surface of contact with the workpiece is moved to the point $\theta_1$. When the electrode is tilted by a further predetermined angle, the center of the contact surface is moved to the point $\theta_2$, resulting in a definition of a surface of contact with the workpiece (current passing surface). These motions are intermittently repeated in a reciprocal manner at intervals of one to several hundreds welds. FIG. 22(b) shows the movement of the center of contact surface with the workpiece, defined on the electrode tip face 20 when the electrode holder is intermittently tilted (inclined) while the electrode including the electrode tip is pivoted. The center of contact when the electrode holder is tilted (inclined) to the point $\theta_1$ and to the point $\theta_2$, respectively, with respect to the point $\theta_0\alpha_0$ on the electrode center line is moved to $\theta_1\alpha_0$ respectively to $\theta_2\alpha_0$. When the electrode is intermittently pivoted to angles of $\alpha_1$ and $\alpha_2$ in the above conditions, the center of contact is moved to $\theta_1\alpha_2$, $\theta_2\alpha_1$, respectively, to $\theta_2\alpha_2$. These motions are repeated to enable use of the whole face of the electrode tip for welding.

The tilt angle $\theta$ of the electrode holder can be freely set within a range of $+/-0$ to 90 deg. The appropriate angle in that range is $+/-0$ to 30 deg. The 0-deg. angle of tilt means that the electrode center axis may be vertical in the course of a reciprocal tilting of the electrode holder. On the other hand, the pivot angle $\alpha$ of the electrode can be freely set within a range of $+/-0$ to 360 deg. The appropriate angle in that range is $+/-10$ to 70 deg. The pivoting directions of the upper and lower electrodes may be either the same or opposite. Note, welds are better when made in a same direction because the nuggets have a uniform shape. The frequencies of tilting and pivoting of the electrode can be freely set within a range of one/weld to one/thousand welds, but the appropriate frequencies of tilting and pivoting range from one/weld to one/five hundred welds.

Figure 19:
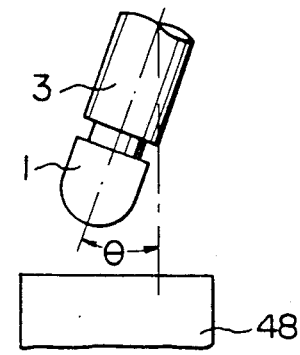
FIG. 19 is a side elevation of an embodiment in which one of the welding electrodes is flat.

A spot welding machine having a pair of opposing electrodes has been described as an example with reference to FIG. 1, but the application of the present invention is not limited to this type of welder. For example, where one of the electrodes in a pair is flat as shown in FIG. 19, only one of the electrodes need be tilted and pivoted.

Next, another embodiment of the present invention will be described below with regard to a method and apparatus in which welds are made by intermittently tilting the electrode holder in all directions with respect to the electrode forcing axis.

Figure 23A:
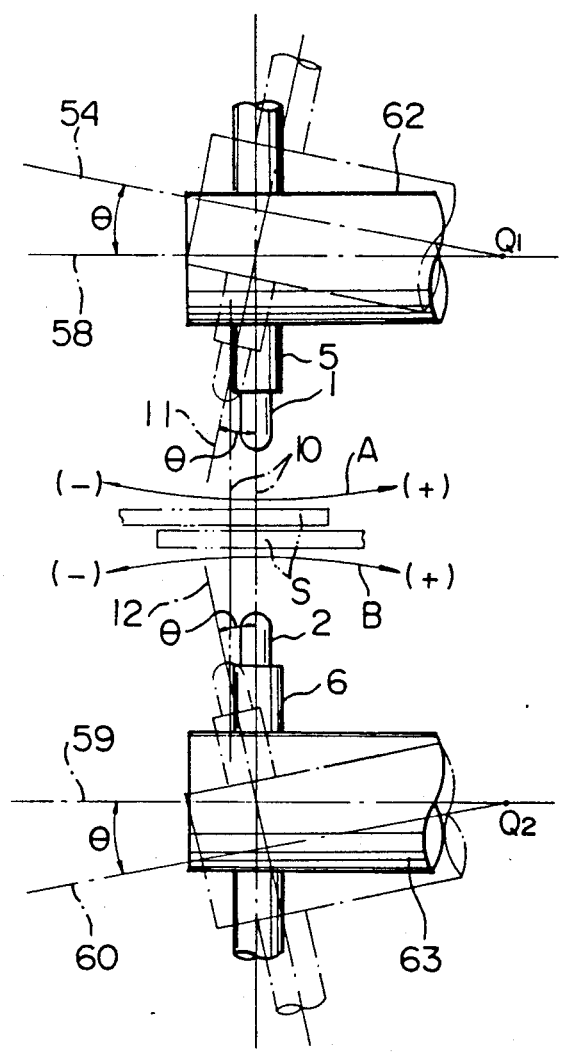
FIG. 23(a) is a side elevation of the electrode assembly, showing another embodiment of the method of resistance welding according to the present invention.
Figure 23B:
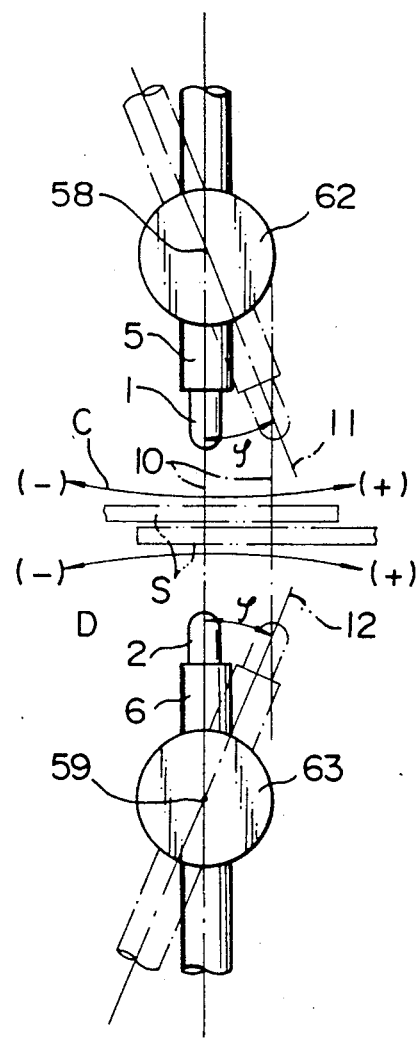
FIG. 23(b) is a front view of the electrode assembly in FIG. 23(a)

As shown in FIG. 23(a), the center axes 11 and 12 through the upper and lower electrode tips 1 and 2 and electrode holders 5 and 6 fixed to upper and lower tilting arms 62 and 63 are tilted (inclined) intermittently by a predetermined angle $\theta$ in the directions of arrows A and B, respectively, with respect to the electrode forcing axis 10 through the workpieces S. In this case, if one of the electrode tips is tilted to the + (plus) side, the other is tilted to the + (plus) side, thereby maintaining the electrode tips at positions always opposite to each other. To this end, the center axes 54 and 60 of the tilting arms 62 and 63 are tilted by a predetermined angle $\theta$, taking as a fulcrum, for example, the points Q1 and Q2 on the center axes 58 and 59 of the upper and lower arms, so that the upper and lower electrodes are opposite to each other. As seen from FIG. 23(b), the center axes 11 and 12 through the electrode tips 1 and 2 and electrode holders 5 and 6, fixed to the upper and lower tilting arms 62 and 63, are intermittently tilted by a predetermined angle $\psi$ in the directions of arrows C and D, respectively, with respect to the forcing axis 10. In this case, if one of the electrode tips is tilted to the + (plus) side, the other is tilted to the + (plus) side, thereby maintaining the electrode tips in a position always opposite to each other. Note that the position of the tilting fulcrum is not limited to the arm center axis, electrode holder center axis or the intersection between these axes, and may be positioned in any other location.

Figure 24A:
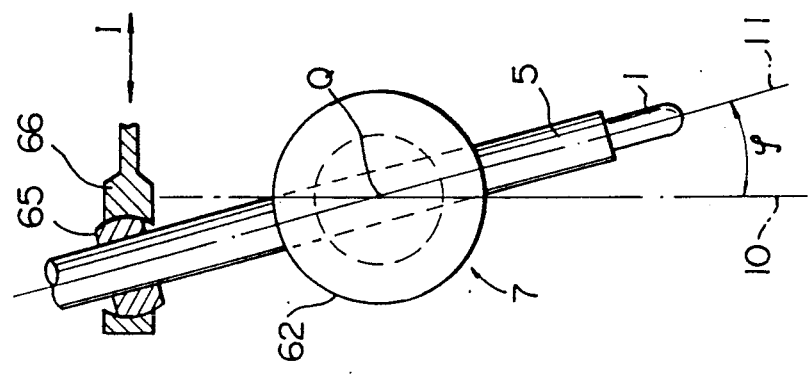
FIG. 24(a) is a side elevation of yet another embodiment of the tilting mechanism for the upper electrode assembly in the resistance welding apparatus according to the present invention.
Figure 24B:
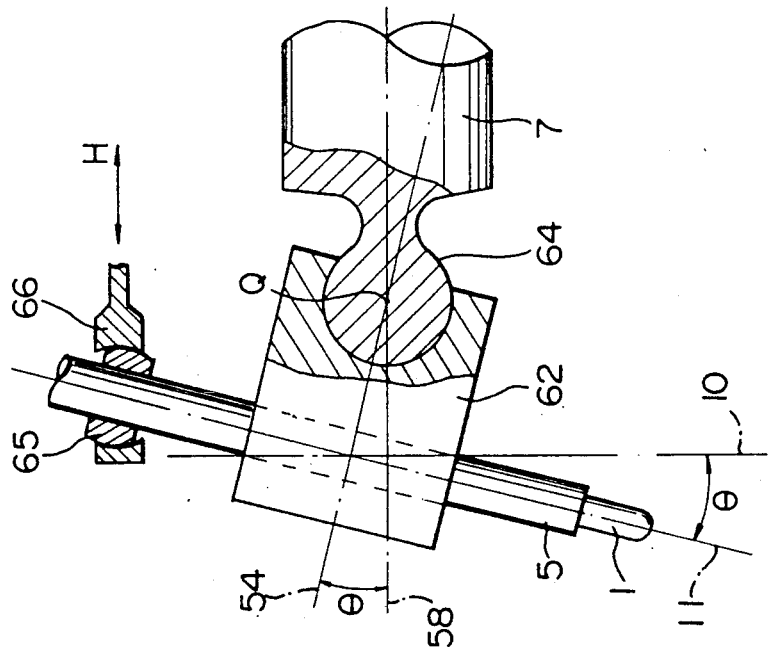
FIG. 24(b) is a front view of the tilting mechanism in FIG. 24(a)

FIG. 24(a) and 24(b) show in detail an embodiment of the present invention in which the electrode assemblies have a tilting function, but show only the upper electrode assembly.

FIG. 24(a) is a side elevation of the upper electrode assembly. The electrode tip 1 is fixed to the electrode holder 5 fixed to the tilting arm 62. The tilting arm 62 is coupled with the stationary arm 7 by a spherical bearing 64 in such a manner as to be slidable while maintaining a sufficient electric contact therebetween. To tilt the center axis of the electrode holder 5 fixed to the tilting arm 62 by a predetermined angle $\theta$ intermittently with respect to the electrode forcing axis 10, a link ball 65 and a spherical bearing 66 are provided at the other end of the electrode holder 5 and are moved a predetermined distance in the direction of arrow H by a cam mechanism or the like, and stopped and fixed there, whereby the center axis 54 of the tilting arm 62 is tilted by an angle $\theta$, taking as a fulcrum of tilt the point Q on the center axis 58 through the stationary arm 7, and the electrode center axis 11 is tilted by an angle $\theta$ and stopped there.

FIG. 24(b) is a front view of the upper electrode and associated parts. To tilt (incline) the electrode center axis 11 by a predetermined angle $\psi$ intermittently with respect to the electrode forcing axis 10, the link ball 65 and spherical bearing 66 provided on the electrode holder 5 are moved by a predetermined distance in the direction of arrow I by a cam mechanism or the like, and stopped and fixed there, whereby the electrode center axis 11 is tilted by an angle $\psi$, taking as fulcrum of tilt the point Q, and stopped there.

Figure 25:
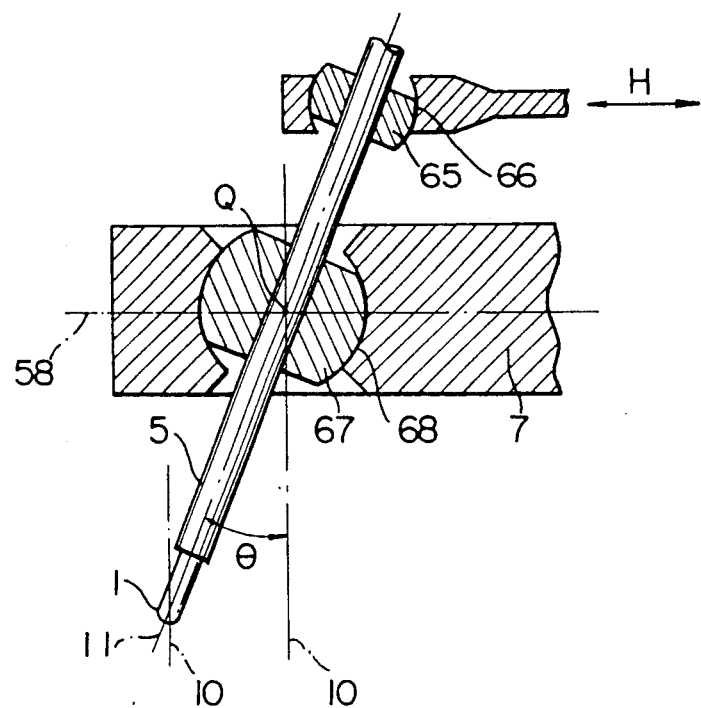
FIG. 25 is a side elevation of a further embodiment of the tilting mechanism for the upper electrode assembly in resistance welding apparatus according to the present invention.

The mechanism for tilting the electrode center axis is not limited to that shown in FIGS. 24(a) and 24(b), but as shown in FIG. 25, for example, the electrode tip 1 and electrode holder 5 are fixed to a link ball 67 provided on the arm 7 and the link ball 67 is coupled with a spherical bearing 68 provided on the arm 7 so as to be slidable while maintaining a sufficient electric contact therebetween. The mechanism for tilting the electrode center axis 11 an angle $\theta$ (or $\psi$) with respect to the electrode forcing axis 10 is as described with reference to FIG. 24. The feature of the embodiment shown in FIG. 25 is such that the fulcrum Q about which the electrode center axis 11 is tilted is at the intersection between the arm center axis 58 and electrode center axis 11.

In this case, the drive for moving the spherical bearing 66 coupled with the link ball 65 in the directions of the arrow H (and I) may be a motor, air cylinder or any other well-known drive which utilizes the up and down motion of the electrode, and the means for transmitting the drive force may be a well-known one selected from among the cam mechanism, linkage, and gears such as rack pinion or the like, chain, belt and the like. The tilting mechanism is not limited to those described above, and for example, one selected from among the rack pinion, cam mechanism, linkage and the like may be used in the direction of the tilting angle $\theta$, and one such as a worm gear, bevel gear or the like used in the direction of the tilting angle $\psi$.

The electrode holder is not tilted when work pieces are held between the electrodes, but only when the electrodes are separated from each other. FIG. 24(a) and 24(b) show an embodiment in which the fulcrum of tilting is placed on the center axis of the arm, and FIG. 25 shows an embodiment in which the fulcrum is at the intersection between the arm and electrode center axes. The present invention is not limited to these embodiments, and the fulcrum may be placed at any other position.

By the electrode assemblies and the method described above, workpieces are held and forced together between the upper and lower electrode tips, and welded to each other while supplied with a current for a predetermined time.

Figures 26A, 26B, 26C:
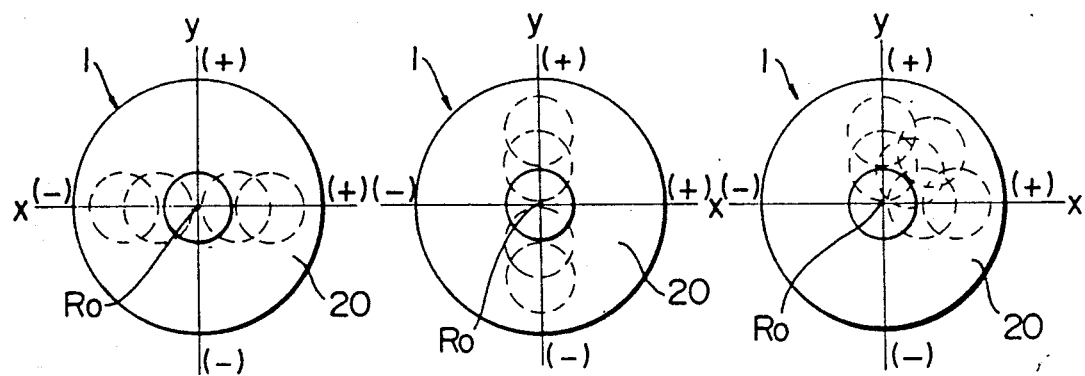
FIGS. 26(a), 26(b) an (c) are plan views, respectively, of the electrode tip, showing a further embodiment of the present invention.

FIGS. 26(a), 26(b) and 26(c) show plan views, respectively, of the electrode tip face when the method described in detail with reference to FIG. 23 is carried out by the welding machine described in detail with reference to FIGS. 24(a) and 24(b) or FIG. 25. When the electrode is tilted at an angle $\theta$ as shown in FIG. 24(a), surfaces of contact with the workpiece are defined on the X-axis having the center $R_0$ on the electrode tip face 20 as shown in FIG. 26(a). On the other hand, when the electrode is tilted at an angle $\psi$ as shown in FIG. 24(b), surfaces of contact with the workpiece are defined on the Y-axis about the center $R_0$ of the electrode tip face 20 as shown in FIG. 26(b). Where these motions are adopted in combination, surfaces of contact with the workpiece are defined in the form of a combined distribution on the X- and Y-axes about the center $R_0$ of the electrode tip face 20 as shown in FIG. 26(c). By repeating these operations, welding is made using the whole electrode tip face.

The extent of the tilt angle of the electrode holder depends upon the mechanism adopted. The tilt angle $\theta$ can be freely set within a range of $+/-0$ to 45 degrees and the tilt angle $\psi$ within a range of $+/-0$ to 60 degrees. The appropriate tilt angle $\theta$ ranges from $+/-0$ to 30 degrees, and the appropriate tilt angle $\psi$ is within a range of $+/-0$ to 30 degrees. The 0-degree tilt angle means that the electrode center axis is vertical in the course of the tilting of the electrode in all directions. The frequency of the electrode tilting can be freely set in a range of one/weld to one/thousand welds. The appropriate frequency of tilting is in a range of one/weld to one/500 welds.

The present invention has been described with regard to a spot welder having a pair of opposing electrodes, with reference to FIG. 23, but one of the electrodes 48 may be, for example, flat, as shown in FIG. 19.

The present invention has been described and illustrated in detail in the foregoing. In the conventional resistance welding, a weld is made through a contact surface of the electrode at a predetermined position, and as the number of welds increases, the area of contact increases and the current density decreases, and finally a predetermined nugget will not be formed. By the method and apparatus according to the present invention, however, usual electrode tips can be used to make a same welding as with the conventional welding operations. Furthermore, even if the surface area of contact with work piece is more or less increased as a result of the alloying of the electrode tip with a coated metal on steel sheet, the current density will decrease only a little since the contact surface is shifted for each weld. Also, since a fresh contact surface dresses the existing contact surface, the surface of contact expands a little even with the alloying of the electrode tip, and thus the current density will decrease only a little while the number of welds (electrode tip life) is improved.

As described in the foregoing, the method and apparatus for intermittently tilting the electrode holder play an extremely important role in an improvement of the electrode tip life.

The present invention is applicable to various types of welding machines such as a series spot welder, multi-spot welder, portable spot welder or the like.

EXAMPLES

Example data on the electrode tip life in the spot welding to which the present invention is applied will be described below.

EXAMPLE 1

Welding was made with the following welding parameters by using a welding machine with the electrodes shown in FIG. 4.

The workpieces welded were two hot-dipped galvanized steel sheets 0.8 mm in thickness (t) and 150/150 (g/m$^2$). The welding parameters were as follows:

| Welding machine | Floor-installed spot welder, 60 kVA |
| --- | --- |
| Electrode shape | Radius type (8R) with cap tip |
| Electrode force | 200 kg |
| Weld time | 10 cycles |
| Welding current | Critical current without expulsion (10,300 +/− 500 A) |
| Weld pitch | 15 mm |
| Weld rate | One weld/2 sec |

For evaluation of the electrode tip life, a nugget diameter measuring test piece was sampled at every 100 welds. The maximum number of welds until a $4\sqrt{t}$ nugget (3.6 mm in diameter) could not be obtained was taken as the electrode tip life. Table 1 shows the welding parameters and results of the electrode tip life evaluation of the present invention in comparison with the conventional resistance welding technique.

Table 1 reveals that the electrode tip life of the present invention is considerably improved, compared with that of the conventional resistance welding technique.

TABLE 1

| Test No. | Tilt angle of electrode holder $\theta$ (deg.) | Pivoting of electrode tip | | Electrode tip life (number of welds) | Remarks |
| --- | --- | --- | --- | --- | --- |
| | | Pivot angle $\alpha$ (deg.) | Frequency of pivoting | | |
| 1 | 0 | 0 | No pivoting | 600 | Conventional technique |
| 2 | 10 | 60 | one/weld | 3800 | Present invention |
| 3 | 15 | 45 | one/20 welds | 5600 | Same as above |
| 4 | 20 | 30 | one/200 welds | 7700 | Same as above |
| 5 | 25 | 45 | one/50 welds | 6300 | Same as above |
| 6 | 30 | 30 | one/100 welds | 8100 | Same as above |

EXAMPLE 2

The work pieces welded were two hot-dipped galvanized steel sheets 0.8 mm in thickness (t) and 150/150 (g/m$^2$). The welding parameters were as follows:

| Welding machine | Floor-installed spot welder, 60 kVA |
| --- | --- |
| Electrode shape | Radius type (15R), 16 mm in diameter |
| Electrode force | 200 kg |
| Weld time | 10 cycles |
| Welding current | Critical current without expulsion (10,300 +/− 500 A) |
| Weld pitch | 15 mm |
| Weld rate | One weld/2 sec |

For evaluation of the electrode tip life, a nugget diameter measuring test piece was sampled at every 100 welds. The maximum number of welds until a $4\sqrt{t}$ nugget (3.6 mm in diameter) could not be obtained was taken as the electrode tip life. Tables 2, 3 and 4 show in detail the welding parameters and results of electrode tip life evaluation of the present invention, in comparison with the conventional resistance welding techniques.

Table 2 shows the results of electrode tip life evaluation where a motor was used to drive the pivoting of the electrode (as in FIGS. 5(a) and 5(b)), revealing that the electrode tip life is much improved in the present invention (test Nos. 7 to 11) compared with that in the conventional resistance welding technique (test No. 1).

Table 4 shows the results of electrode tip life evaluation where the coolant flow was used to drive the pivoting of the electrode (as in FIGS. 18 to 25), revealing that the electrode tip life in the system (test Nos. 13 to 20; flow rate of coolant:2.5 liters/min) according to the present invention is much improved compared with that in the convention technique even when the methods for electrode rotation and stop are changed, respectively.

TABLE 2

| Test No. | Tilt angle of electrode holder θ (deg.) | Pivoting of electrode tip | | Electrode tip life (number of welds) | Remarks |
| --- | --- | --- | --- | --- | --- |
| | | Pivot angle α (deg.) | Frequency of pivoting | | |
| 1 | 0 | 0 | No pivoting | 600 | Conventional technique |
| 7 | 5 | 60 | one/weld | 3800 | Present invention |
| 8 | 10 | 45 | one/20 welds | 5600 | Same as above |
| 9 | 10 | 60 | one/200 welds | 7700 | Same as above |
| 10 | 15 | 45 | one/50 welds | 6300 | Same as above |
| 11 | 20 | 30 | one/100 welds | 8100 | Same as above |

TABLE 3

| Test No. | Tilt angle of electrode holder θ (deg.) | Pivoting of electrode tip (one/weld) | | | Electrode tip life (number of welds) | Remarks |
| --- | --- | --- | --- | --- | --- | --- |
| | | Pivot angle α (deg.) | Guide recess system (number of bendings) | Cam system (number of cam teeth) | | |
| 1 | 0 | 0 | — | — | 600 | Conventional technique |
| 12 | 5 | 45 | 8 | | 8500 | Present invention |
| 13 | 10 | 60 | 6 | | 5300 | Same as above |
| 14 | 15 | 90 | 4 | | 3600 | Same as above |
| 15 | 5 | 30 | | 12 | 11400 | Same as above |
| 16 | 10 | 45 | | 8 | 8200 | Same as above |
| 17 | 15 | 60 | | 6 | 6100 | Same as above |

TABLE 4

| Test No. | Tilt angle of electrode holder θ (deg.) | Pivoting of electrode tip | | | Electrode tip life (number of welds) | Remarks |
| --- | --- | --- | --- | --- | --- | --- |
| | | Method of pivoting and stopping | Pivot angle α (deg.) | Frequency of pivoting | | |
| 1 | 0 | — | 0 | — | 600 | Conventional technique |
| 18 | 5 | Electrode force | Random | One/weld | 9700 | Present invention |
| 19 | 10 | Electrode force | Random | One/weld | 10600 | Same as above |
| 20 | 5 | Change of coolant route | 45 | One/10 welds | 6300 | Same as above |
| 21 | 10 | Change of coolant route | 60 | One/50 welds | 5500 | Same as above |
| 22 | 15 | Change of coolant route | 90 | One/100 welds | 5300 | Same as above |
| 23 | 5 | Braking | 30 | One/10 welds | 8800 | Same as above |
| 24 | 10 | Braking | 45 | One/50 welds | 7600 | Same as above |
| 25 | 15 | Braking | 60 | One/100 welds | 6500 | Same as above |

Table 3 shows the results of an electrode tip life evaluation where the up and down motion of the electrode was used to drive the pivoting of the electrode (as in FIGS. 6 and 10), revealing that the electrode tip lives in both the guide recess system (test Nos. 12 to 14) and cam system (test Nos. 15 to 17) are much improved compared with that in the conventional technique.

EXAMPLE 3

Welds were made with the following welding parameters by a welding machine in which an electrode holder 5 for the electrode provided with a pivoting mechanism shown in FIG. 4 is fixed to a pivoting arm shown in FIG. 20.

The workpieces welded were two hot-dipped galvanized steel sheets 0.8 mm in thickness (t) and 150/150 (g/m$^2$). The welding parameters were as follows:

| Welding machine | Floor-installed spot welder, 60 kVA |
|---|---|
| Electrode shape | Radius type (8R) with cap tip |
| Electrode force | 200 kg |
| Weld time | 10 cycles |
| Welding current | Critical current without expulsion (10,300 +/− 500 A) |
| Weld pitch | 15 mm |
| Weld rate | One weld/2 sec |

For evaluation of the electrode tip life, a nugget diameter measuring test piece was sampled at every 100 welds. The maximum number of welds until a 4√t nugget (3.6 mm in diameter) could not be obtained was taken as the electrode tip life. Table 5 shows in detail welding parameters and results of electrode tip life evaluation of the present invention in comparison with the conventional resistance welding technique.

| Welding machine | Floor-installed spot welder, 60 kVA |
|---|---|
| Electrode shape | Radius type (8R) with cap tip |
| Electrode force | 200 kg |
| Weld time | 10 cycles |
| Welding current | Critical current without expulsion (10,300 +/− 500 A) |
| Weld pitch | 15 mm |
| Weld rate | One weld/2 sec |

For evaluation of the electrode tip life, a nugget diameter measuring test piece was sampled at every 100 welds. The maximum number of welds until a 4√t nugget (3.6 mm in diameter) could not be obtained was taken as the electrode tip life. Table 6 shows in detail the welding parameters and results of electrode tip life evaluation of the present invention in comparison with the conventional resistance welding technique.

Table 6 reveals that the electrode tip life in the present invention is considerably improved compared with that in the conventional resistance welding technique.

TABLE 6

| Test No. | Tilting of electrode holder ($\theta$) | | Pivoting of electrode tip ($\psi$) | | Electrode tip life (number of welds) | Remarks |
|---|---|---|---|---|---|---|
| | Tilt angle $\theta$ (deg.)* | Frequency of tilting | Pivot angle $\psi$ (deg.) | Frequency of tilting | | |
| 1 | 0 | No tilting | 0 | No tilting | 600 | Conventional technique |
| 32 | 0 to 10 (interval: 5) | One/100 welds | 0–15 (interval: 5) | One/20 welds | 6200 | Present invention |
| 33 | 5 to 15 (interval: 5) | One/200 welds | 0–15 (interval: 5) | One/50 welds | 5900 | Same as above |
| 34 | 0 to 10 (interval: 5) | One/100 welds | 5–20 (interval: 5) | One/20 welds | 9700 | Same as above |
| 35 | 5 to 15 (interval: 5) | One/200 welds | 5–20 (interval: 5) | One/50 welds | 8800 | Same as above |
| 36 | 0 to 10 (interval: 5) | One/100 welds | 0–30 (interval: 10) | One/50 welds | 13100 | Same as above |
| 37 | 5 to 15 (interval: 5) | One/200 welds | 0–30 (interval: 10) | One/100 welds | 11300 | Same as above |

*Method of tilting (example)
For 0 to 10 (interval: 5), the electrode holder was reciprocally tilted between 0° and 10° at intervals of 5°.

Table 5 reveals that the electrode tip life in the present invention is considerably improved compared with that in the conventional resistance welding technique.

TABLE 5

| Test No. | Tilting of electrode holder | | Pivoting of electrode tip | | Electrode tip life (number of welds) | Remarks |
|---|---|---|---|---|---|---|
| | Tilt angle $\theta$ (deg.)* | Frequency of tilting | Pivot angle $\alpha$ (deg.) | Frequency of pivoting | | |
| 1 | 0 | No tilting | 0 | No pivoting | 600 | Conventional technique |
| 26 | 0 to 15 (interval: 5) | One/100 welds | 45 | One/20 welds | 7300 | Present invention |
| 27 | 0 to 15 (interval: 5) | One/200 welds | 60 | One/50 welds | 6700 | Same as above |
| 28 | 5 to 20 (interval: 5) | One/100 welds | 45 | One/20 welds | 10800 | Same as above |
| 29 | 5 to 20 (interval: 5) | One/200 welds | 60 | One/50 welds | 9500 | Same as above |
| 30 | 0 to 30 (interval: 10) | One/100 welds | 30 | One/50 welds | 14300 | Same as above |
| 31 | 0 to 30 (interval: 10) | One/200 welds | 45 | One/100 welds | 12100 | Same as above |

*Method of tilting (example)
For 0 to 15 (interval: 5), the electrode holder was reciprocally tilted between 0° and 15° at intervals of 5°.

EXAMPLE 4

Welds were made with the following welding parameters by a welding machine provided with an all-direction tilting mechanism shown in FIG. 24.

The workpieces welded were two hot-dipped galvanized steel sheets 0.8 mm in thickness (t) and 150/150 (g/m$^2$). The welding parameters were as follows:

We claim:
1. A method of resistance welding with electrode tip faces of a pair of opposing electrodes placed in contact with surfaces of workpieces, said method comprising inclining both or one of the center axis of a pair of opposing electrodes with respect to an electrode forcing axis and placing the electrode tip face on the surface of workpiece and welding said workpieces; then tilting the electrode center axis with respect to the electrode forcing axis and forming a next electrode tip face for welding, and placing said electrode tip face on the surface of workpiece and thereafter welding said workpieces; thereby the welding of a preselected number of welds being carried out with the electrode tip placed in contact with the workpiece surface by intermittently tilting the electrode about the electrode center axis and forming a new contact face of the electrode tip.

2. A method of resistance welding according to claim 1, wherein both or one of the center axis of the pair of opposing electrodes are or is intermittently tilted in all directions with respect to the electrode forcing axis.

3. A method of resistance welding according to claim 1 or 2, wherein one or both of the center axis of axes of a pair of opposing electrodes is or are intermittently pivoted about the electrode center axis for welding.

4. A resistance welding apparatus having a pair of opposing electrodes one ore both of which include or includes an electrode tip for placement on a workpiece surface, comprising an apparatus associated with an electrode holder fixed to the electrode tip, comprising a tilting arm fixed to the electrode holder at one end thereof and coupled with a stationary arm at another end thereof through a tilting mechanism, whereby the electrode center axes or axis of both or one or the electrodes are or is inclined and fixed at a predetermined angle with respect to the electrode forcing axis.

5. A resistance welding apparatus according to claim 4, comprising the titling arm having the electrode holder fixed to one end thereof and the other end coupled by a pin in such a manner that the electrode holder can be tilted on the sliding surface of a stationary arm, and comprising a rack-pinion mechanism for tiling the electrode holder.

6. A resistance welding apparatus according to claim 4, comprising said electrode holder having a worm wheel and worm provided at the other end thereof for tilting the electrode holder.

7. A resistance welding apparatus according to claim 4, wherein the electrode holder having the electrode fixed to one end thereof is fixed to a pivoting arm which is coupled with a stationary arm by a spherical bearing, the other end of said electrode holder being coupled wit the spherical bearing by a link ball, and a drive is provided to reciprocally drive said spherical bearing.

8. A resistance welding apparatus according to claim 7, wherein said spherical bearing is provided at an end of the stationary arm.

9. A resistance welding apparatus according to claim 7, wherein said spherical bearing is provided inside the stationary arm.

10. A resistance welding apparatus having a pair of opposing electrodes both or one of which include or includes an electrode tip for placement on a workpiece surface, comprising an apparatus associated with an electrode holder fixed to the electrode tip, and a tilting arm fixed to the electrode holder at one end thereof and coupled with a stationary arm at another end thereof through a tilting mechanism, whereby the electrode center axes or axis of both or one of the electrodes are or is inclined and fixed at a predetermined angle with respect to the electrode forcing axis, and means for pivoting the inclined electrode tip about the electrode center axis by a predetermined angle.

11. A resistance welding apparatus having a pair of opposing electrodes both or one of which include or includes an electrode tip for placement on a workpiece surface, comprising at least one electrode inclined with respect to an electrode forcing axis, and a pivotable mechanism for pivoting a shank or an electrode holder fixed to the electrode tip by a worm wheel and worm, whereby the electrode tip is pivoted about the center axis of the electrode.

12. A resistance welding apparatus according to claim 11, wherein said pivotable mechanism comprises the electrode holder coupled with a drive by a coupling shaft, the electrode holder being pivoted by said drive.

13. A resistance welding apparatus according to claim 11, wherein said pivotable mechanism comprises a pivotable electrode holder having a pivot guide recess formed in a surface thereof, a pivot guide pin is fixed on a stationary electrode holder, and a spring is disposed between said pivotable electrode holder and stationary electrode holder, so that the pivotable electrode holder is pivoted under electrode force exerted on said electrode tip.

14. A resistance welding apparatus according to claim 11, wherein said pivotable mechanism comprises cams engaged with pivotable and stationary electrode holders, respectively, a cam positioning pin fixed on the stationary electrode holder, and a spring provided between said pivotable and stationary electrode holders, so that the pivotable electrode holder is pivoted under electrode force exerted on said electrode tip.

15. A resistance welding apparatus according to claim 11, wherein said pivotable mechanism comprises a water wheel having an outlet hole formed therein and fixed at a top end of a pivotable electrode holder, said water wheel being pivoted under a fluid pressure to pivot said pivotable electrode holder.

16. A resistance welding apparatus according to claim 15, having a pivoting control mechanism for said pivotable electrode holder.

* * * * *

UNITED STATES PATENT AND TRADEMARK OFFICE
CERTIFICATE OF CORRECTION

PATENT NO. : 5,047,608
DATED : September 10, 1991
INVENTOR(S) : Yasuo TAKAHASHI, et al.

It is certified that error appears in the above-identified patent and that said Letters Patent is hereby corrected as shown below:

On the title page: [54], change "INCLUDED" to --INCLINED--.

Column 1, line 4, change "INCLUDED" to --INCLINED--.

Column 3, line 6, change "upper-arn" to --upper-arm--.

Column 3, line 38, change "In Figure," to --In FIG. 2,--

Column 5, line 17, change "is" to --are--.

Column 10, line 12, change "FIG." to --FIGS.--.

Column 16, line 7, change "convention" to --conventional--.

Column 19, line 14, change "ore" to --or--.

Column 19, line 39, change "wit" to --with--.

Signed and Sealed this

Eighteenth Day of May, 1993

Attest:

MICHAEL K. KIRK

*Attesting Officer*    *Acting Commissioner of Patents and Trademarks*